United States Patent [19]
Goto

[11] 3,944,814
[45] Mar. 16, 1976

[54] LIGHT DETECTING APPARATUS OF IMPROVED RESOLUTION

[75] Inventor: Koichi Goto, Hiratsuka, Japan

[73] Assignee: Kabushiki Kaisha Komatsu Seisakusho, Tokyo, Japan

[22] Filed: June 14, 1974

[21] Appl. No.: 479,584

[30] Foreign Application Priority Data
June 18, 1973   Japan.................. 48-68539

[52] U.S. Cl............................ 250/209; 250/203 R
[51] Int. Cl.² ........................................ H01J 39/12
[58] Field of Search ........... 356/4, 5, 141, 152, 153, 356/172; 250/202, 203, 209, 208, 237 R, 237 G, 230

[56] References Cited
UNITED STATES PATENTS

| | | | |
|---|---|---|---|
| 3,303,347 | 2/1967 | Wingate | 250/237 R |
| 3,532,892 | 10/1970 | Murphy | 356/152 |
| 3,640,628 | 2/1972 | Jones | 356/4 |
| 3,649,122 | 3/1972 | Holtz | 356/172 |
| 3,697,760 | 10/1972 | Biet et al. | 250/209 |
| 3,709,609 | 1/1973 | Spengler et al. | 250/230 |
| 3,742,222 | 6/1973 | Endl | 250/209 |

*Primary Examiner*—Archie R. Borchelt
*Assistant Examiner*—D. C. Nelms
*Attorney, Agent, or Firm*—Spensley, Horn and Lubitz

[57] ABSTRACT

There are provided a plurality of light receiving elements arranged at a predetermined spacing therebetween to be irradiated by a light beam, a plurality of logical product circuits, each being provided for a pair of adjacent light receiving elements and connected thereto to receive the detection outputs thereof for producing an output only when the pair of adjacent light receiving elements are irradiated at the same time, and a detection signal selection circuit connected to respond to the detection outputs of the irradiated elements and the output signals from the logical product circuits for selectively gating out one of the detection outputs and the output signals of the logical product circuits which indicate the centers of the irradiated positions, thereby accurately detecting the center of the irradiated position.

3 Claims, 3 Drawing Figures

FIG. I(a) PRIOR ART
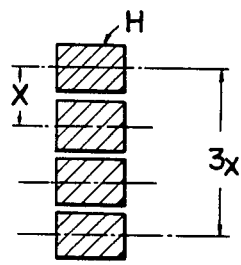
FIG. I(b)
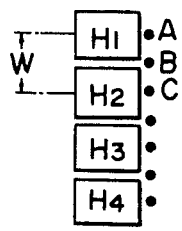
FIG. 2
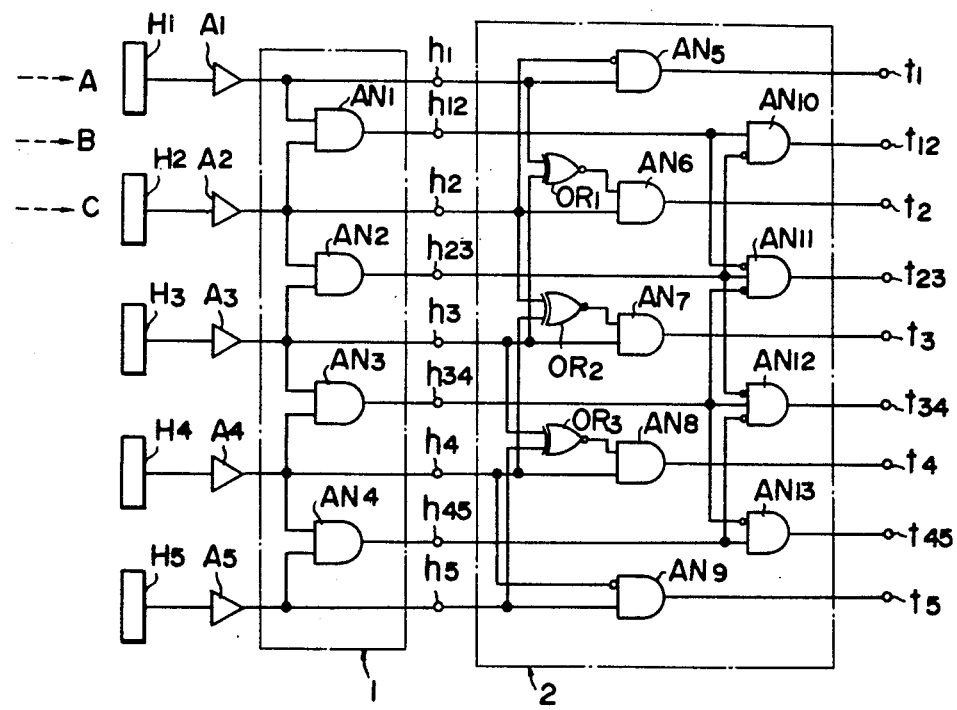

LIGHT DETECTING APPARATUS OF IMPROVED RESOLUTION

BACKGROUND OF THE INVENTION

This invention relates to an apparatus for detecting positions illuminated by a light beam by using light receiving elements and, more particularly, to light detecting apparatus of improved resolution of displacements.

A light detecting apparatus using light receiving elements has been used to detect the movement or displacement of a movable body such as a working blade of an earth moving equipment. In such apparatus, a plurality of light receiving elements or photoelectric transducers are arranged on the movable body for detecting the position irradiated by a light beam by projecting the light beam upon the array of the light receiving elements thereby causing a particular light receiving element illuminated by the light beam to generate an electric signal. However, according to the prior art light detecting apparatus, since the electric signal generated by the light receiving elements in this manner is used directly as an illuminated position detection signal, the resolution of the displacement has been limited by the spacing between the light receiving elements and the width illuminated by the light beam. The term "resolution of displacement" is used herein to represent a minimum unit of the displacement that can be detected so that as the resolution is increased, the accuracy of detection can also be improved.

More particularly, with the prior art arrangement, when the spacing between adjacent light receiving elements H is represented by X cm, the resolution will be given by X cm, as diagrammatically shown in FIG. 1a. Accordingly, when the displacement to be detected is 3X cm, the displacement is detected in three steps. Further, in order to obtain such resolution, the width of the light beam should be limited such that the beam will not illuminate two or more light receiving elements at the same time. Accordingly, where the source of the light beam is spaced considerably from the light receiving elements as in the case wherein the light detecting apparatus is used for automatic level adjustment of a bulldozer or a grader, the width of the light beam increases when it impinges upon the light receiving elements with the result that sufficiently high detection accuracies can hardly be obtained.

In the prior art apparatus, it is possible to improve the resolution only by decreasing the spacing between adjacent light receiving elements, but this measure increases the number of the light receiving elements. Since these light detecting apparatus are generally used in the outdoor, it is necessary to provide expensive interference filters or the like for responsive light receiving elements for the purpose of improving the signal to noise ratio with respect to the sun light. This also increases the number or component elements and the cost of the apparatus.

SUMMARY OF THE INVENTION

Accordingly, it is an object of this invention to provide a novel light detecting apparatus having an improved resolution and capable of accurately determining the center of the irradiated position even when the width of the light beam is increased.

Another object of this invention is to provide a new and improved light detecting apparatus capable of doubling the resolution with the same number of light receiving elements as in the prior art apparatus.

According to this invention there is provided light detecting apparatus of the improved resolution comprising a plurality of light receiving elements arranged at a predetermined relative spacing therebetween, means for projecting a light beam upon said light receiving elements, a plurality of logical product circuits, each being provided for a pair of said adjacent light receiving elements and connected thereto to receive the detection outputs thereof for producing an output only when said pair of adjacent light receiving elements are irradiated by the light beam at the same time, and a detection signal selection circuit connected to respond to the detection outputs which are produced from the light receiving elements irradiated by the light beam and the output signals from the logical product circuits for selectively gating out one of the detection outputs and the output signals of the logical product circuits, thereby accurately detecting the center of the irradiated position.

BRIEF DESCRIPTION OF THE DRAWING

In the accompanying drawing:

FIG. 1a is a diagram to explain the resolution of a prior art light detecting apparatus;

FIG. 1b is a diagram to explain the resolution of the novel light detecting apparatus embodying the invention and having an improved resolution; and FIG. 2 is a block diagram of one embodiment of the light detecting apparatus having an improved resolution.

DESCRIPTION OF THE PREFERRED EMBODIMENT

As diagrammatically shown in FIG. 2, a preferred embodiment of this invention comprises five light receiving elements $H_1$ through $H_5$, which are arranged at an equal spacing W, amplifiers $A_1$ through $A_5$ for amplifying the outputs of the respective light receiving elements and a logical product circuit 1 including a plurality of AND gates circuits $AN_1$ through $AN_4$ which are connected such that the output signals from the light receiving elements $H_1$ and $H_2$ are applied to the inputs of the AND gate circuit $AN_1$ through amplifiers $A_1$ and $A_2$ respectively, that the output signals from the light receiving elements $H_2$ and $H_3$ are applied to the inputs of the AND gate circuit $AN_2$ through amplifiers $A_2$ and $A_3$ respectively, that the output signals from light receiving elements $H_3$ and $H_4$ are applied to the inputs of the AND gate circuit $AN_3$ through amplifiers $A_3$ and $A_4$ respectively and that the output signals from the light receiving elements $H_4$ and $H_5$ are applied to the inputs of the AND gate circuit $AN_4$ through amplifiers $A_4$ and $A_5$ respectively. Furthermore, the output signals from the respective light receiving elements are applied directly to terminals $h_1$ through $h_5$ respectively, and the output of the respective AND gate circuits are applied to output terminals $h_{12}$, $h_{23}$, $h_{34}$ and $h_{45}$, respectively. Thus, where any one of the AND gate circuits produces an output, two light receiving elements are illuminated by the light beam so that the output of each AND gate circuit shows a position intermediate these two light receiving elements. For this reason, such output is hereinafter termed "an intermediate position detection signal". On the other hand, where only one of the elements is illuminated by the light beam, a detection signal will be applied to only one of the terminals $h_1$ through $h_5$. In this manner, terminals $h_1$ through $h_5$ correspond to the positions of the respective light receiving elements whereas output terminals $h_{12}$, $h_{23}$, $h_{34}$ and $h_{45}$ correspond to intermediate positions between the respective light receiving elements, where any one or more of the light receiving elements are illuminated by the light beam, the number of the terminals which are supplied with the detection signal or signals and/or the intermediate position detection signal or signals among the terminals $h_1$ through $h_5$ and $h_{12}$, $h_{23}$, $h_{34}$ and $h_{45}$ is always an odd number. Accordingly, it is possible to know a particular one output terminal corresponding to the center of the position irradiated by the beam.

A detection signal selection circuit 2 is provided for this purpose including output terminals $t_1$ through $t_5$ and $t_{12}$, $t_{23}$, $t_{34}$ and $t_{45}$ corresponding to terminals $h_1$ through $h_5$ and $h_{12}$, $h_{23}$, $h_{34}$ and $h_{45}$ respectively. This circuit is constructed such that even when the width of the projected light beam covers three light receiving elements it can detect the center of the width. To this end, in the illustrated example, the detection signal selection circuit 2 is constructed by exclusive NOR gate circuits $OR_1$, $OR_2$ and $OR_3$ and AND gate circuits $AN_5$ through $AN_{13}$ connected as shown.

The effect of doubling the resolution of displacement provided by the invention will now be described with reference to FIG. 1b and FIG. 2. When the light beam irradiates only the light receiving element $H_1$, a detection signal is applied to terminal $h_1$. Since a signal of low level applied to terminal $h_2$ is applied to an inhibiting input of AND gate circuit $AN_5$, AND gate circuit $AN_5$ will be enabled. As a result, an output is applied to output terminal $t_1$ thus detecting position A. When the light beam irradiates both light receiving elements $H_1$ and $H_2$, the AND gate circuit $AN_1$ is enabled to apply a signal to output terminal $h_{12}$ indicating a position intermediate of the elements $H_1$ and $H_2$.

Since the detection signal at terminal $h_2$ is a high level signal and then applied to the inhibiting input of AND gate circuit $AN_5$, this AND gate circuit is inhibited and disenabled.

As the detection signal at terminal $h_1$ is applied to one input of the exclusive NOR gate circuit $OR_1$ whereas as the low level signal at terminal $h_3$ is applied to the other input of the exclusive NOR gate circuit $OR_1$, this NOR gate circuit produces a low level output signal, whereby the AND gate circuit $AN_6$ is disenabled. The intermediate position detection signal appearing at terminal $h_{12}$ is applied to one input of AND gate circuit $AN_{10}$ and the low level signal appearing at terminal $t_{23}$ is impressed upon the other input, which is an inhibiting input, of AND gate circuit $AN_{10}$ so that this AND gate circuit is enabled to provide an output at the output terminal $t_{12}$. In this manner, of the detection signals and the intermediate position detection signal appearing at the terminals $h_1$, $h_2$ and $h_{12}$ respectively, the intermediate position detection signal appearing at terminal $h_{12}$ and corresponding to the center of the portion illuminated by the light beam is selected whereby position B is detected.

When the light receiving element $H_2$ only is illuminated, AND gate circuit $AN_6$ is enabled by the detection signal appearing at terminal $h_2$ thus producing an output at the output terminal $t_2$ whereby position C is detected.

It will be understood from the above description that the positions A, B and C respectively illuminated by the light beam have been detected. Thus, if a spacing between adjacent light receiving elements is expressed as W, the resolution can be expressed by W/2 which means that the resolution is doubled when compared with that of the prior art light detecting apparatus shown in FIG. 1a.

Let us now consider a case wherein the distance between the source of light beam and the light receiving elements is so large that the width of the light beam is considerably increased when it reaches the light receiving elements.

It is now assumed that the width of the light beam is increased sufficiently to irradiate three light receiving elements $H_2$, $H_3$ and $H_4$ at the same time. Under these conditions AND gate circuits $AN_2$ and $AN_3$ are enabled to apply intermediate position detection signals upon terminals $h_{23}$ and $h_{34}$ respectively. A low level signal from terminal $h_1$ is impressed upon exclusive NOR gate circuit $OR_1$ whereby the output thereof becomes a low level signal. Accordingly, AND gate circuit $AN_6$ is disenabled thus blocking the detection signal appearing at terminal $h_2$. The intermediate position detection signal appearing at terminal $h_{34}$ is applied to the inhibiting input of AND gate circuit $AN_{11}$ so that this AND gate circuit is disenabled thus blocking the intermediate position detection signal appearing at terminal $h_{23}$. Similarly, since the intermediate position detection signal appearing at terminal $h_{23}$ is applied to the inhibiting input of AND gate circuit $AN_{12}$, this AND gate circuit is disenabled thus blocking the intermediate position detection signal appearing at terminal $h_{34}$. The low level signal appearing at terminal $h_5$ is applied to one input of exclusive NOR gate circuit $OR_3$ thus causing this circuit to provide a low level output. As a result, AND gate circuit $AN_8$ is disenabled to block the detection signal appearing at terminal $h_4$. Detection signals appearing at terminals $h_2$ and $h_4$ are applied to both input of exclusive NOR gate circuit $OR_2$ thus causing it to produce a high level output. Since the detection signal at terminal $h_3$ is a high level one, AND gate circuit $AN_7$ is enabled to produce an output at output terminal $t_3$ alone. Thus, the detection signal appearing at terminal $h_3$ and corresponding to the center of the portion irradiated by the light beam is detected. In this manner, it is possible to accurately detect the center of the portion irradiated by the light beam even when the width of the light beam is increased.

Although in the selection circuit respective signals were processed in terms of positive logic, it will be clear that it is also possible to process the signals in terms of negative logic by using logic elements of a different type.

It should also be understood that for the purpose of doubling the resolution the light receiving elements are not required to be always arranged at exactly the same spacing but merely required to be arranged at substantially the same spacing. It is also possible to double the resolution even when the light receiving elements are arranged along a curve instead of being arranged along a straight line as shown in the drawing. Further, it will be clear that as the number of the light receiving elements is increased, the number of the logical elements utilized in the logical product circuit 1 and the detection signal selection circuit 2 should also be increased.

Although in the embodiment shown in FIG. 2, the detection signal selective circuit 2 is constructed such that it can detect the center of the portion irradiated by the light beam even when the light beam has a width sufficient to irradiate three light receiving elements simultaneously it is possible to modify the construction of the circuit 2 such that it can detect the center of the irradiated portion when the width of the light beam is large enough to illuminate at the same time any desired number of light receiving elements.

As has been described hereinabove, the invention provides an inexpensive and extremely accurate light detection apparatus capable of doubling the resolution without increasing the number of the light receiving elements and detecting the center of the portion irradiated by the light beam regardless of the variation in the width of the light beam.

What is claimed is:

1. A light detecting apparatus of improved resolution comprising a plurality of light receiving elements arranged at a predetermined relative spacing in a row and producing detection output signals when said light receiving elements receive light, means for projecting a light beam upon said light receiving elements, a plurality of sequentially ordered logical produce circuits, each of said logical product circuits provided for every pair of adjacent light receiving elements and connected to receive the detection output signals of said pair of adjacent light receiving elements to produce an output signal only when said pair of adjacent light receiving elements are simultaneously irradiated by said light beam, wherein said detection output signals and output signals of said logical product circuits are an odd number of sequentially ordered signals, and a detection signal selection circuit connected to said light receiving elements and to said logical product circuits to respond to said detection output signals and said output signals of said logical product circuits to select from one of said plurality of light receiving elements said one light receiving element being irradiated by the center of said light beam, by selectively gating out a center signal of said odd number of sequentially ordered signals of said detection output signals and said output signals of said logical product circuits.

2. The light detecting apparatus according to claim 1 wherein each of said logical product circuits comprises an AND gate circuit with its input terminals respectively connected to a pair of said adjacent light receiving elements.

3. The light detecting apparatus according to claim 1 wherein said detection signal selection circuit comprises a plurality of exclusive NOR gate circuits, each having input terminals connected to two light receiving elements interleaved by one light receiving element, a first group of AND gate circuits being a first and second AND gate circuit ($AN_5$, $AN_9$), each of said AND gate circuits having an input terminal connected to each one of said light receiving elements of a pair of adjacent light receiving elements ($H_1$ and $H_2$, $H_4$ and $H_5$) provided on the opposite ends of said row of the light receiving elements, said first AND gate circuit coupled to one said pair of light receiving elements at one end of said row, and said second AND gate circuit coupled to said other pair of light receiving elements at the opposite end of said row, a second group of AND gate circuits having two inputs terminals ($AN_6$, $AN_7$, $AN_8$), each of said second group of AND gate circuits having one input terminal thereof connected to the output of a corresponding one of said exclusive NOR gate circuits and the other input terminal thereof connected to a corresponding one of the light receiving elements, the output terminals of said second group of AND gate circuits being a first set of output nodes, and a third group of AND gate circuits ($AN_{10}$, $AN_{11}$, $AN_{12}$, $AN_{13}$) each of said AND gate circuits having its input terminals connected to the output terminals of corresponding ones of said logical product circuits each of said AND gate circuits having one input terminal coupled to one of said sequentially ordered logical product circuits, and having an inverting input terminal coupled to at least one logical product circuit adjacent to said one logical product circuit.

* * * * *